(12) United States Patent
Poe

(10) Patent No.: US 11,103,106 B1
(45) Date of Patent: Aug. 31, 2021

(54) GRILL FOR COOKING FOOD

(71) Applicant: Tony W. Poe, Tuscumbia, AL (US)

(72) Inventor: Tony W. Poe, Tuscumbia, AL (US)

(73) Assignee: Tony W. Poe

( * ) Notice: Subject to any disclaimer, the term of this patent is extended or adjusted under 35 U.S.C. 154(b) by 0 days.

(21) Appl. No.: 15/925,183

(22) Filed: Mar. 19, 2018

(51) Int. Cl.
*A47J 37/07* (2006.01)

(52) U.S. Cl.
CPC .... *A47J 37/0704* (2013.01); *A47J 2037/0795* (2013.01)

(58) Field of Classification Search
CPC ........ A47J 33/00; A47J 37/07; A47J 37/0694; A47J 37/0713; A47J 36/027; A47J 36/42; B32B 23/08; B32B 27/10; B32B 27/32; F24C 15/14
USPC ...................................... 126/25 R
See application file for complete search history.

(56) References Cited

U.S. PATENT DOCUMENTS

| | | | |
|---|---|---|---|
| 366,733 A | 7/1887 | Millett | |
| 839,581 A | 12/1906 | Harman | |
| 3,596,591 A | 8/1971 | Spates | |
| 4,422,441 A | 12/1983 | Schoepe | |
| 4,840,118 A | 6/1989 | Rinehart | |
| 4,862,792 A | 9/1989 | Lerma, Jr. | |
| 5,481,964 A | 1/1996 | Kitten | |
| 5,692,550 A | 12/1997 | Ford et al. | |
| 5,814,396 A | 9/1998 | Weidner et al. | |
| 5,960,782 A | 10/1999 | Clements et al. | |
| 6,039,039 A | 3/2000 | Pina, Jr. | |
| 7,905,225 B2 | 3/2011 | Contarino | |
| 9,433,321 B2 | 9/2016 | Piazzi | |
| 2016/0264329 A1* | 9/2016 | Radosta | B65D 65/40 |
| 2017/0020336 A1* | 1/2017 | Cole | A47J 37/0704 |

* cited by examiner

*Primary Examiner* — Avinash A Savani
(74) *Attorney, Agent, or Firm* — Decker Jones, PC; Brian K. Yost

(57) ABSTRACT

A grill for cooking food has a housing with side walls and a cover. One of the side walls has an opening. A drawer has drawer side walls, a front, and an open bottom. The drawer has a grill surface. The drawer is located in the opening and is moveable between an open position and a closed position. When the drawer is in the closed position, the drawer is located in the housing with the grill surface located above the heat source, and when the drawer is in the open position, the grill surface is substantially located outside of the housing interior. An absorbent curtain is located outside of the housing interior space and between the one housing side wall and the drawer front. The curtain collapses when the drawer is in the closed position, and the curtain being extended and located below the grill surface when the drawer is in the open position.

8 Claims, 7 Drawing Sheets

GRILL FOR COOKING FOOD

FIELD OF THE INVENTION

The present invention relates to grills for cooking food, such as barbecue grills and the like.

BACKGROUND OF THE INVENTION

Outdoor cooking grills are a popular way to cook food. One type of cooking grill typically has a closed cooking chamber. Inside the cooking chamber is a heat source, such as charcoal, and a grill surface. The cooking chamber is accessed by opening a cover or lid on top of the grill surface.

Opening the cover allows heat to escape the cooking chamber. This increases cooking time. In addition, opening the cover subjects the user, or cook, to the high heat. The user can use tools such as a long fork or a flat spatula to turn the food, but the user's hands typically are located over the grill surface and subjected to the heat. This results in discomfort and singed hair. Additionally, the user is subjected to smoke, which can be unpleasant.

In the prior art, various grill designs provide for the grill surface to be pulled out to the side, while allowing the cover to remain closed. These designs allow the user to turn the food without being subjected to the heat.

SUMMARY OF THE INVENTION

A grill for cooking food comprises a housing having side walls and a cover. The side walls and cover form an interior space. The housing contains a heat source in the interior space. One of the side walls has an opening. A drawer has drawer side walls, a front, and an open bottom. The drawer has a grill surface. The is drawer located in the opening and is moveable between an open position and a closed position. When the drawer is in the closed position, the drawer is located in the housing with the grill surface located above the heat source, and when the drawer is in the open position, the grill surface is substantially located outside of the housing interior. An absorbent curtain is located outside of the housing interior space and between the one housing side wall and the drawer front. The curtain collapses when the drawer is in the closed position, the curtain being extended and located below the grill surface when the drawer is in the open position.

In accordance with one aspect, the curtain is an accordion type.

In accordance with another aspect, the curtain comprises polyester.

In accordance with another aspect, support rods are attached to the drawer front and extend into the interior space when the drawer is in the closed position, the curtain supported by the support rods.

In accordance with another aspect, the drawer front further comprises a storage space for the curtain when the drawer is in the closed position.

In accordance with another aspect, the curtain is removably coupled to the one housing side wall and the drawer front.

In accordance with another aspect, the drawer further comprises a rear wall, the rear wall closing the opening in the one side wall when the drawer is in the open position.

In accordance with another aspect, the curtain is an accordion type and the curtain comprises polyester. Support rods are attached to the drawer front and extend into the interior space when the drawer is in the closed position, the curtain being supported by the support rods. The drawer front further comprises a storage space for the curtain when the drawer is in the closed position. The curtain is removably coupled to the one housing side wall and the drawer front.

DESCRIPTION OF THE PREFERRED EMBODIMENT

The grill has a housing and is provided with a drawer section fitted thereto. The drawer has a grill surface for cooking food. The drawer slides in and out of the housing to allow alternately cooking and checking the food for cooking progress, all without the need to open the top of the grill housing. As a result, an operator or user can check on the cooking progress of the food without being exposed to the heat of the grill and with a minimal loss of cooking heat from the grill.

In addition, the drawer has a lower curtain that deploys and extends when the drawer is pulled out of the housing. The curtain prevents dripping grease and other fluids from leaving the drawer and falling to the floor. When the drawer is closed, the curtain collapses or folds and remains outside of the housing so as not to be exposed to the heat inside the grill.

The drawer can be provided in a section that can be retrofitted to existing grills, or it can be provided into a new grill.

Figure 1:
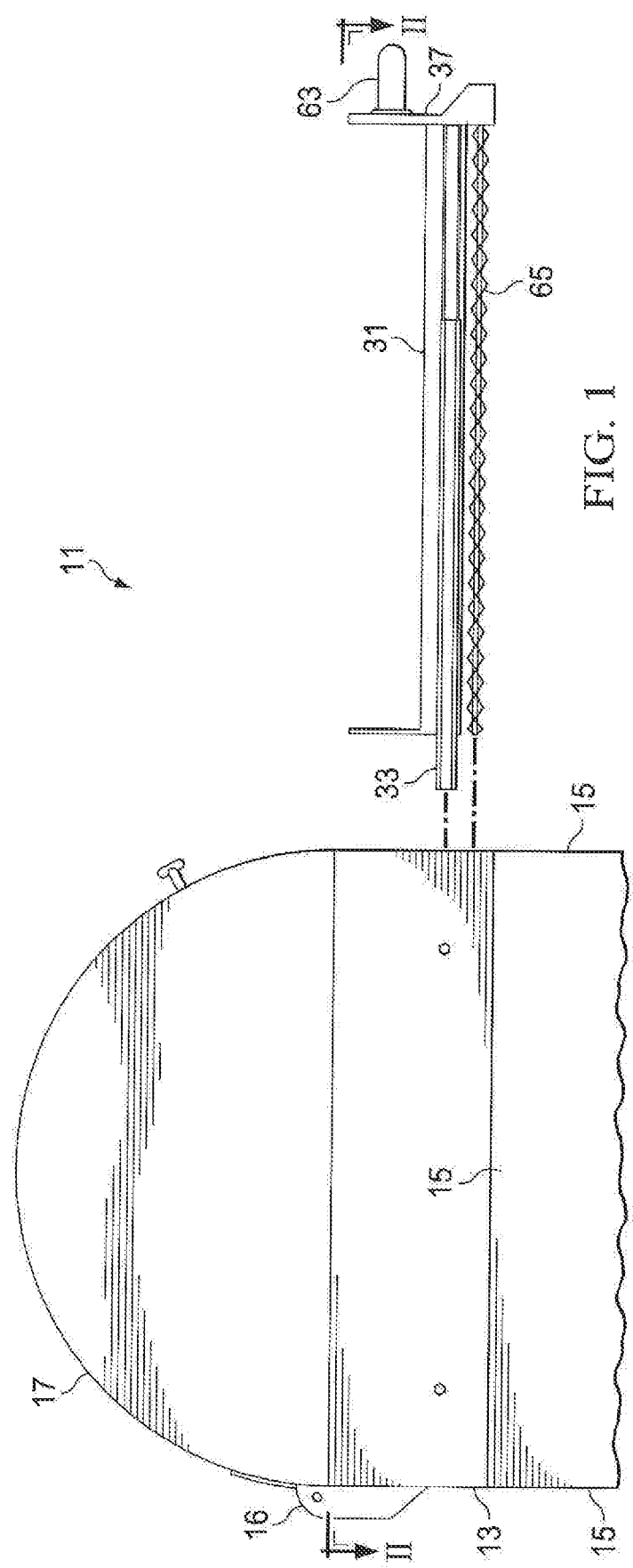
FIG. 1 is a side view of the grill in accordance with a preferred embodiment of the present invention, shown with the cooking drawer pulled out.
Figure 2:
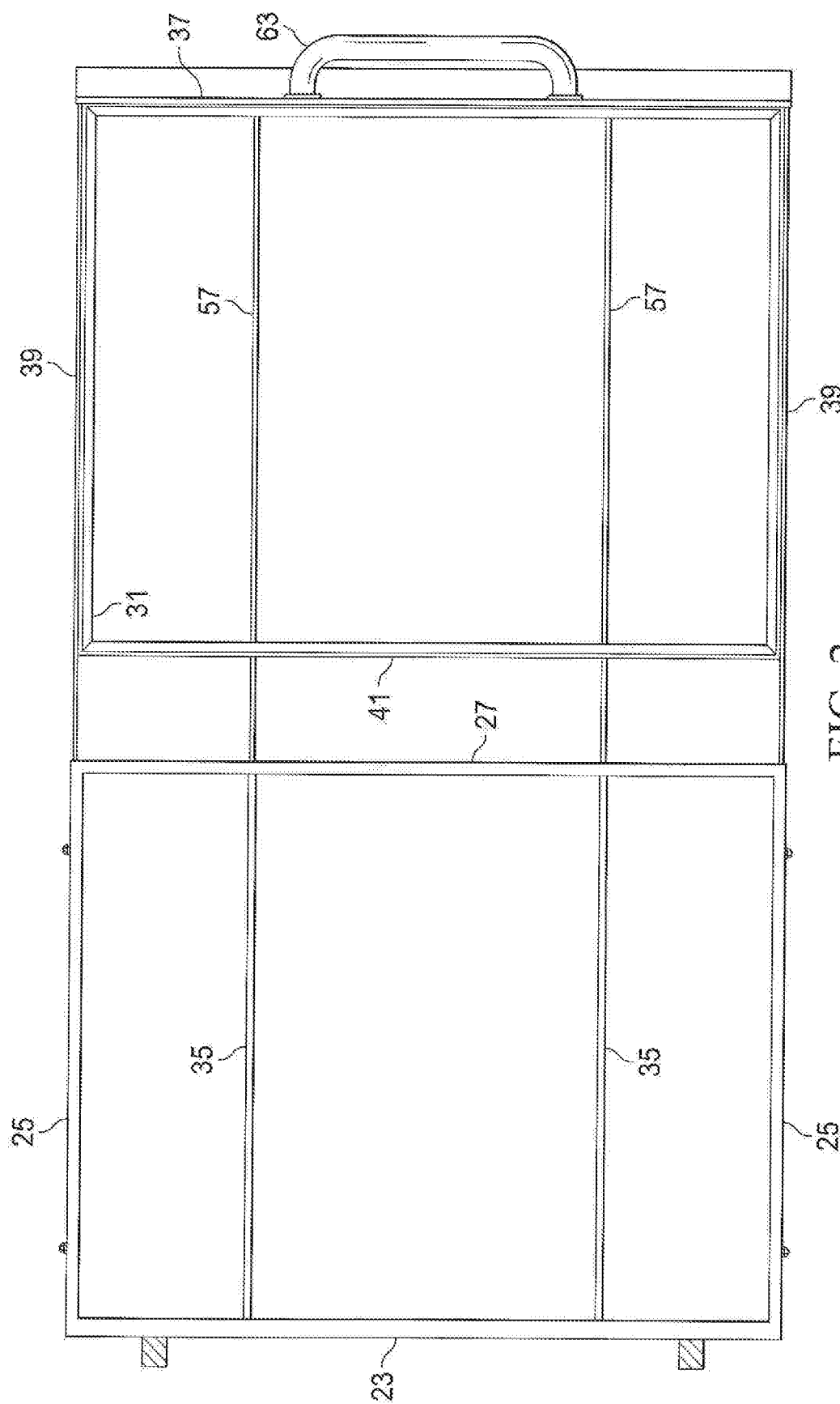
FIG. 2 is a cross-sectional view of the grill, taken along lines II-II of FIG. 1.
Figure 4:
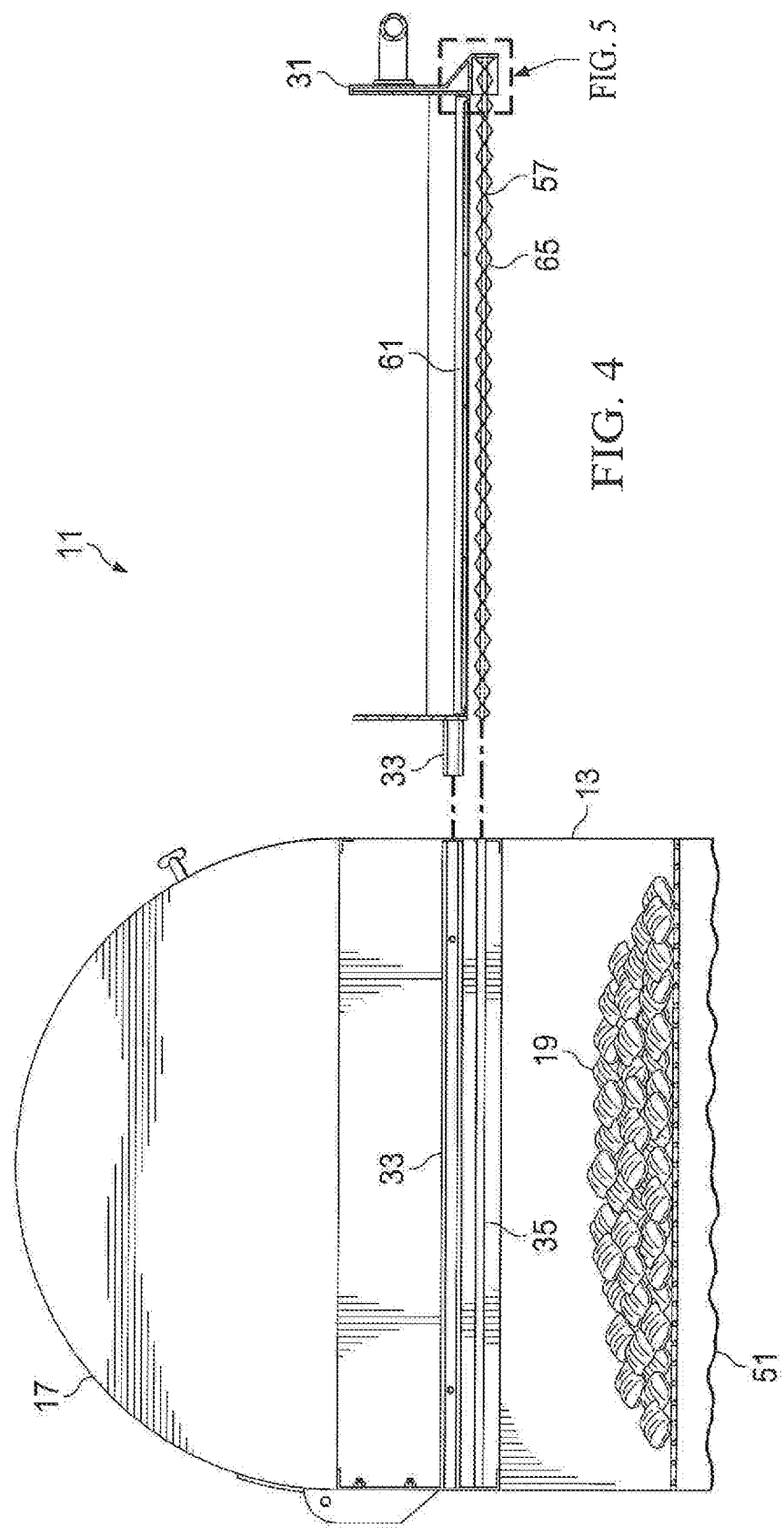
FIG. 4 is a side cross-sectional view of the cooking drawer and grill housing taken along lines IV-IV of FIG. 2.

The grill 11 will now be described in more detail, referring to the figures. The grill has a housing 13 (see FIGS. 1 and 4). The housing 13 has side walls 15 and a cover, or lid 17. The side walls have a front side wall, facing the user, a rear side wall, and lateral side walls. The cover 17 is hinged 16 to a side wall so that the cover can be opened and closed. The cover has a handle. The housing 13 may contain a bottom wall. Alternatively, the bottom of the housing can be open. The housing may be on legs, on a stand or some other support structure.

Figure 3:
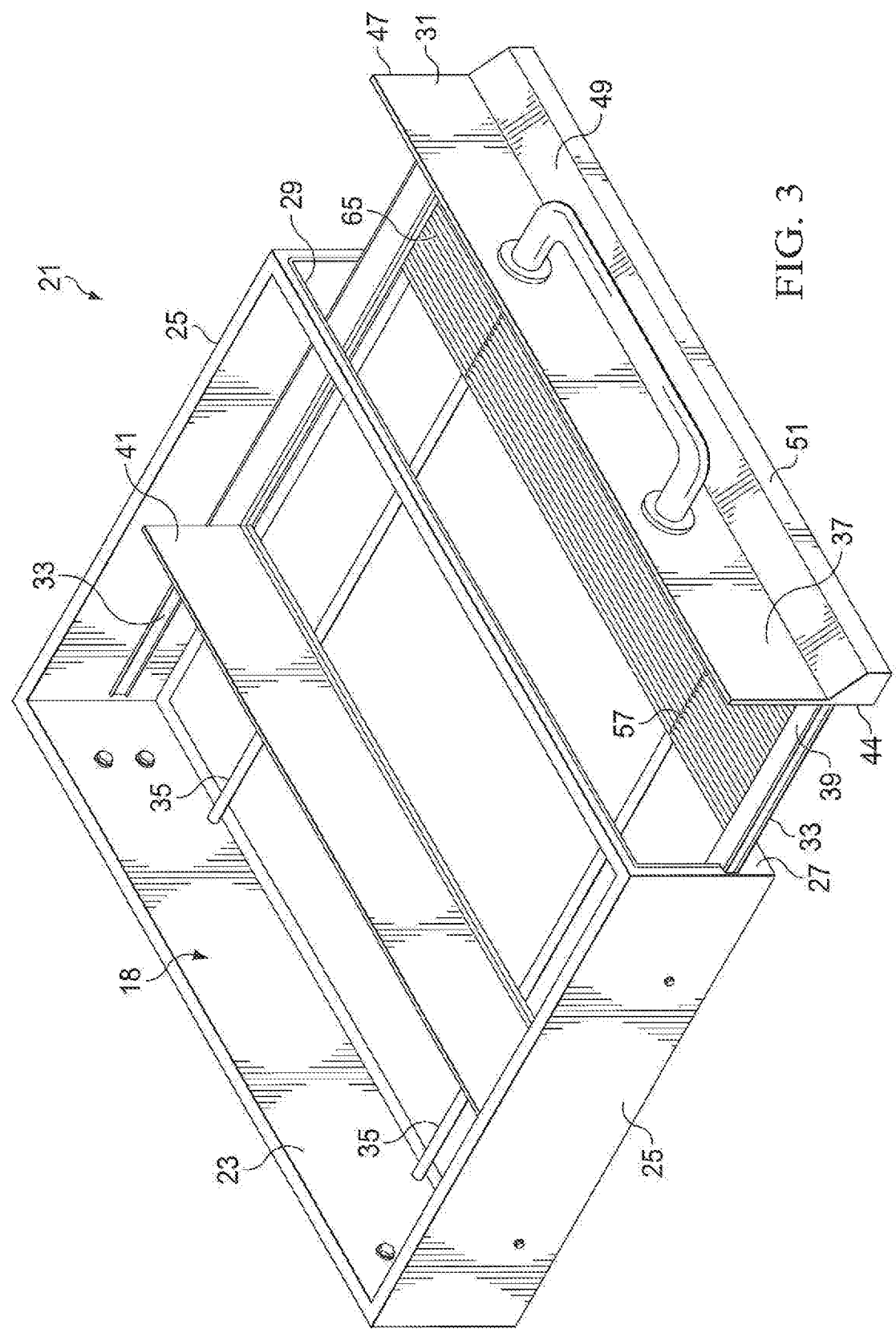
FIG. 3 is a perspective view of the grill section.

The housing 13 forms an interior space 18 (FIG. 3). A lower part of the interior space contains a heat source 19 (see FIG. 4). One type of heat source is charcoal. The charcoal is placed on the bottom wall and ignited. Another type of heat source is propane. Burners are located inside the housing, which burners are connected to a propane source by way of one or more valves. A shield may be provided over the burners to prevent grease from dripping down directly onto the burners.

The grill is provided with a drawer section 21 (see FIG. 3) located beneath the cover 17. The drawer section has side walls, namely a rear side wall 23 and two lateral side walls 25. There is also a front side wall 27, which has an opening 29 for receiving a drawer 31.

The drawer section 21 can be integral to the grill, such as when the grill is fabricated with the drawer section. In such a case, the drawer section side walls 25 are integral to the grill housing side walls 15. The drawer section can also be retrofitted to existing grills. In such a case, the cover is removed from the grill, the drawer section 21 located on top of the housing and coupled thereto (for example by straps and fasteners), and the cover attached to the drawer section rear side wall 23 by way of the hinges 16.

The drawer section has drawer slides 33 located in the interior space and mounted to the lateral side walls 25. The drawer slides 33 are conventional and commercially available and are preferably heavy duty. In addition, the drawer section has rod slide tubes 35 that extend from the rear side wall 23 to the front side wall 27. The rod slide tubes 35 are located below the opening 29 in the front side wall 27. The rod slide tubes can be square or circular in transverse cross section. If the tubes are square in cross-section, the tubes are oriented so that an edge faces up, to allow grease to drain more easily from the tubes.

The drawer 31 has a front wall 37, side walls 39 and a rear wall 41. Each drawers slide 33 has a fixed part mounted to the respective side wall 25 and a movable part mounted to the respective drawer side wall 39. The rear wall 41 is sized so as to close off the opening 29 when the drawer is fully extended.

The front wall 37 of the drawer is sized larger than the opening 29 so as to overlay and close the opening when the drawer is closed. The lower portion of the front wall flares out away from the interior space 18 so as to form a curtain storage space 44. This storage space 44 extends for the width of the drawer. In the preferred embodiment, the front wall 37 (see FIG. 5) is made of a sheet of metal bent into various sections or portions, namely a lower vertical portion 51, an inclined portion 49, an outer upper vertical portion 47, an inside upper portion 57 that parallels the outer upper vertical portion 47 and an interior horizontal member 53. A gap is located between the two upper vertical portions 47, 55 to provide some insulation. The interior horizontal member 53 extends at a right angle from the inside upper portion 57 and abuts near the junction of the inclined portion 49 and the lower vertical portion 51. Thus, the storage space 44 is formed by the interior horizontal member 53, the lower vertical portion 51 and, when the drawer is fully closed, the front side wall 27. The storage space 44 is open along the bottom.

Figure 5:
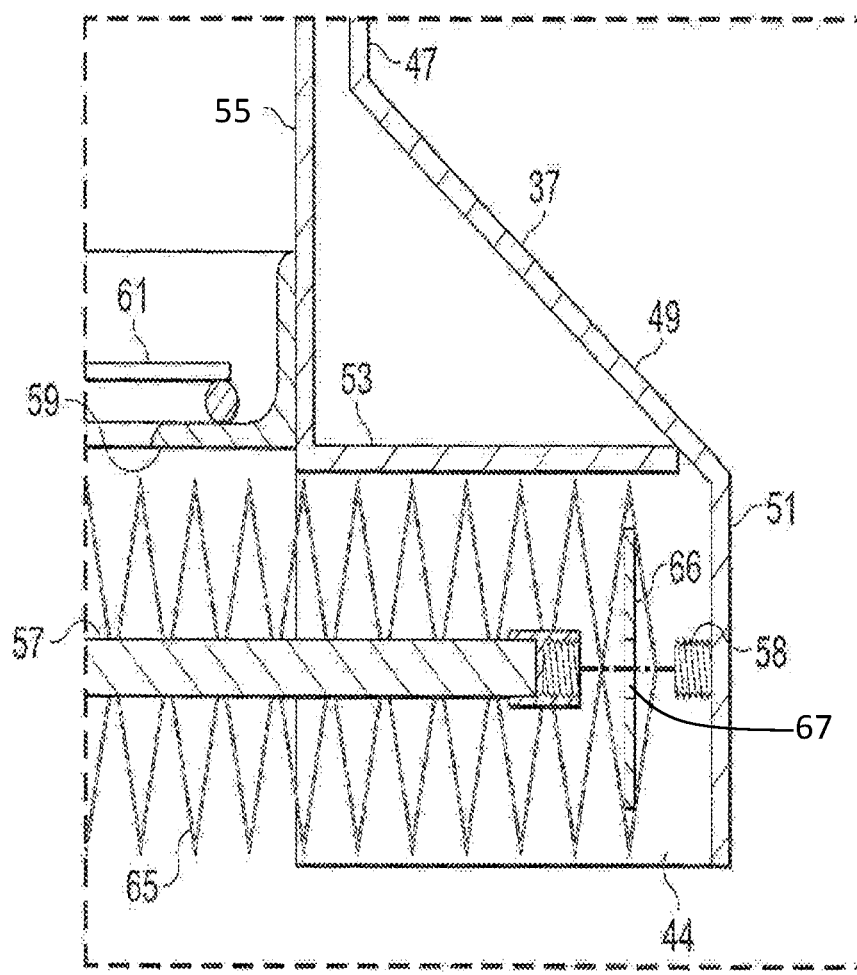
FIG. 5 is a detail side view of the cooking drawer.

The drawer also has support rods 57 extending from the interior of the lower vertical portion 51. For example, as shown in FIG. 5 by an exploded view, each end of the rods 57 can be threaded onto a threaded fitting, such as a stud 58, on the lower vertical portion. The free ends of the support rods are received by the rod slide tubes 35 and through respective holes in the front wall 37.

Lips 59 are provided along the inside of the front wall 37, the rear wall 41 and the side walls 39 of the drawer. The lips 59 project to the interior of the drawer and support a grill 61. The grill 59 is located above the support rods 57. The grill 61 of course supports food during cooking and is perforated to allow heat to pass upwardly and grease to drop through. The grill can be of the wire type, which is conventional and commercially available. Other types of grills can be used as cooking surfaces to support the food during cooking.

A handle 63 is provided on the front wall 37 of the drawer. The drawer 31 can be opened and closed with the handle. When closed, the grill 61 is located in the interior space 18 of the housing 13. The drawer front wall 37 closes the opening 29 so that heat is contained inside the housing. To open, the drawer 31 is pulled out along the drawer slides 33. The drawer can be extended so as to fully expose, or expose most of, the grill to the outside of the housing. When fully opened, the rear wall 41 closes the opening 29 to retain the heat inside the interior space 18.

A user can access the grill and the food thereon when the drawer 31 is open, without being exposed to the heat. The user can check on the condition of food on the grill, turn the food, add or remove pieces of food. The cover 17 can remain closed when the drawer is pulled out.

While the drawer is open, grease from food on the grill can drop through the grill 61. A grease curtain 65 is provided to catch the grease and other liquids that fall through the grill 61. The grease curtain 65 is absorbent and accordion-like in construction to allow for extension and retraction. When the drawer is closed, the grease curtain 65 is retracted or collapsed and located in the storage space 44 along the bottom of the drawer front. The grease curtain is outside of the housing and not exposed to the heat in the interior space. When the drawer is extended, the grease curtain is extended to cover the underneath area of the grill 61, so as to capture grease and other liquids falling through the grill. The grease curtain 65 is supported by the support rods 57, whether the grease curtain is extended or collapsed. The extended grease curtain is also outside of the housing and not exposed to the heat from inside the housing.

The grease curtain 65 is made of a material that can be a spun laced polyester, a spun-bond polyester, or a thermo-bond polyester. The material is made into an accordion. One source of a suitable grease curtain is a cellular blind for a window. U.S. Pat. No. 5,692,550 describes a cellular window blind, the entire disclosure of which is incorporated herein by reference. The blind can be cut to the appropriate dimensions. In the embodiment shown, the curtain is made of single cells, so as present two layers for liquid absorption. Other embodiments can use more than two layers, such as may found in double or triple cell curtains.

Figure 6A:
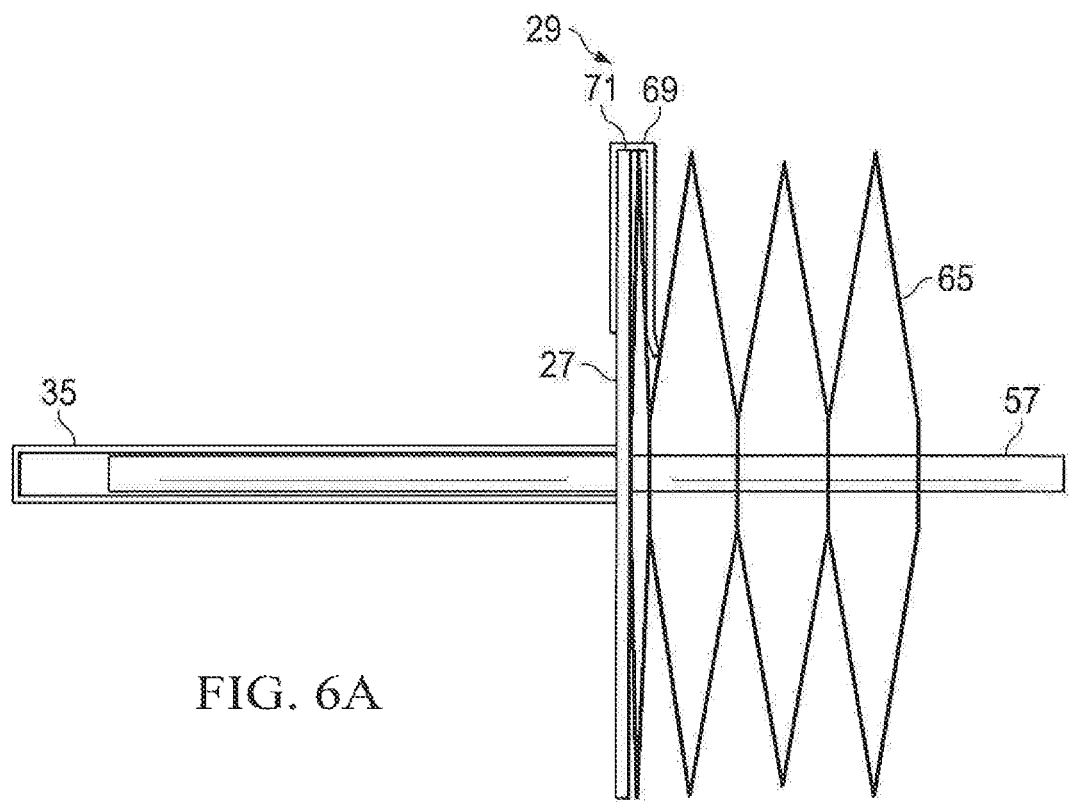
FIG. 6A is a detail side view showing the retainer clip and grease curtain arrangement.
Figure 6B:
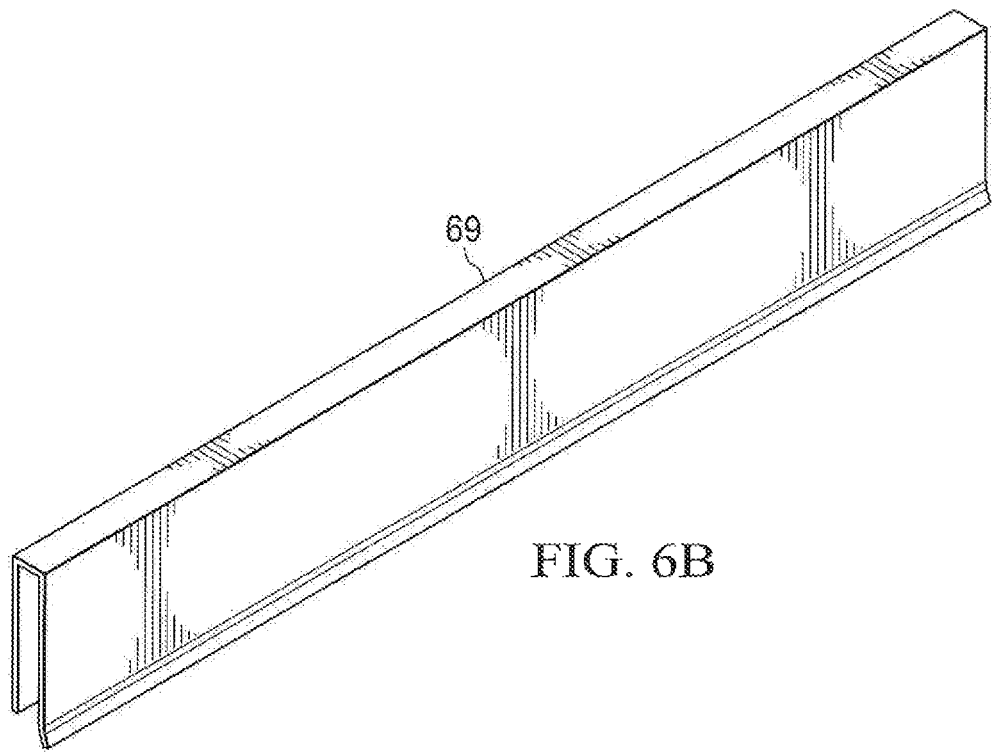
FIG. 6B is a perspective view of the retainer clip of FIG. 6A.
Figure 7:
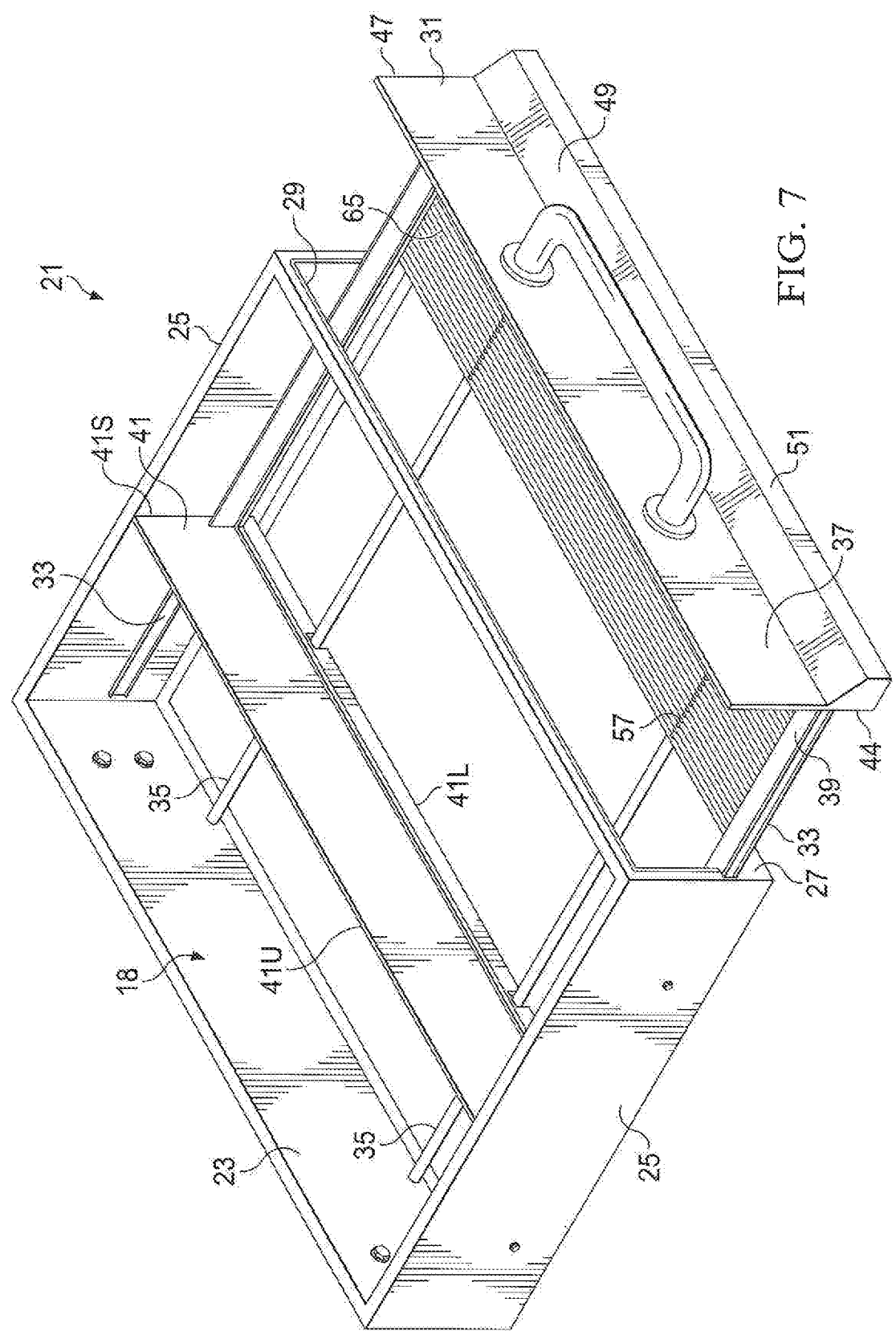
FIG. 7 is a perspective view of the grill section, shown in accordance with another embodiment.

The grease curtain 65 is removably mounted to the drawer. This allows the grease curtain to be replaced after it becomes saturated with a sufficient amount of liquid. Holes are formed through the grease curtain, which holes receive the support rods 57. The grease curtain has two end cells. Each end cell is mounted to the appropriate structure. One end cell is mounted to the drawer front 37, while the other is mounted to the front wall 27 of the housing. The one end of the curtain is mounted to the drawer front 37 by a stay 66. The stay 66 is inserted into the endmost cell (see FIG. 5). The stay 66 extends the width of the drawer and has holes 67 formed therein for receiving the threaded studs 58 on the drawer. The stay 66 is located and clamped between the drawer front 37 and the support rods 57. The other end cell is retained to the front wall by a retainer clip 69. The retainer clip is located along the bottom inside edge 71 of the front wall opening 29 (see FIGS. 6A and 6B). The retainer clip 69 extends along the inside surface of the front wall and also along the outside surface. The endmost cell of the curtain is located with the clip 69, so as to be retained therein.

As the drawer 31 is pulled open, one end of the curtain remains fixed to the front wall 27 by the retainer clip 69, while the other end is pulled out by the drawer. The curtain expands and is supported by the support rods. The curtain covers the area underneath the grill 61 surface and prevents liquids from falling through onto the floor, or the user's feet.

As the drawer 31 is closed, the curtain, again supported by the support rods, collapses and occupies the storage space 44 along the bottom of the drawer front. The grill is now located inside the housing and the food is once again exposed to the heat.

When the curtain becomes saturated or laden with grease, it is replaced with new and clean curtain. To replace, the drawer is opened and the grill 61 is removed by lifting off of the lips 59. The retainer clip 69 is removed from the grill edge to free the inside end of the curtain. The curtain typically collapses toward the drawer front. This exposes the support rods 57, which can be rotated to unscrew from the studs 58. Once unscrewed, the rods are pushed partially into the support tubes 35. The stay 66 is now uncoupled from the drawer and the curtain, no longer supported, can fall to the ground. The used curtain can be disposed of. The stay is inserted into a new curtain and the process reversed to install.

The drawer thus allows a user to access the food during cooking without being subject to the direct heat of cooking. The rear wall 41 closes off the opening 29 when the drawer is opened. The cover 17 can be raised to access the interior space to add charcoal or for other reasons.

The foregoing disclosure and showings made in the drawings are merely illustrative of the principles of this invention and are not to be interpreted in a limiting sense.

The invention claimed is:

1. A grill for cooking food, comprising: a) a housing having housing side walls and a cover, the housing side walls and cover forming an interior space, the housing containing a heat source in the interior space; b) one of the housing side walls having an opening; c) a drawer having drawer side walls, a front, and an open bottom, the drawer having a grill surface, the drawer located in the opening and moveable between an open position and a closed position, wherein when the drawer is in the closed position, the drawer is located in the housing with the grill surface located above the heat source, and when the drawer is in the open position, the grill surface is at least partially positioned outside of the housing interior; d) an absorbent curtain located outside of the housing interior space and between the one housing side wall having an opening and the drawer front; e) a lowermost portion of the curtain being positioned at a level at or above a lowermost portion of the drawer; and f) the curtain collapsing when the drawer is in the closed position, the curtain extended and located below the grill surface when the drawer is in the open position; g) the curtain is an accordion type; h) support rods are attached to the drawer front and extend into the interior space when the drawer is in the closed position, the curtain being supported by the support rods; i) the drawer front further comprises a storage space for the curtain when the drawer is in the closed position; j) the curtain is removably coupled to the one housing side wall having an opening and the drawer front.

2. The grill for cooking food of claim 1 wherein the curtain comprises polyester.

3. The grill for cooking food of claim 1 further comprising support rods attached to the drawer front and extending into the interior space when the drawer is in the closed position, the curtain supported by the support rods.

4. The grill for cooking food of claim 1 wherein the drawer front further comprises a storage space for the curtain when the drawer is in the closed position.

5. The grill for cooking food of claim 1 wherein the curtain is removably coupled to the one housing side wall having an opening and the drawer front.

6. The grill for cooking food of claim 1 wherein the drawer further comprises a rear wall, the rear wall closing the opening in the one housing side wall having an opening when the drawer is in the open position.

7. The grill for cooking food of claim 1 wherein:
   a) the curtain is an accordion type and the curtain comprises polyester;
   b) support rods are attached to the drawer front and extend into the interior space when the drawer is in the closed position, the curtain being supported by the support rods;
   c) the drawer front further comprises a storage space for the curtain when the drawer is in the closed position;
   d) the curtain is removably coupled to the one housing side wall having an opening and the drawer front.

8. The grill for cooking food of claim 3, wherein the support rods are threaded through the curtain.

* * * * *